US008050169B2

(12) United States Patent
Bakx

(10) Patent No.: US 8,050,169 B2
(45) Date of Patent: Nov. 1, 2011

(54) OPTICAL SCANNING DEVICE AND METHOD FOR DETERMINING FOCUS POSITION

(75) Inventor: Johannes Leopoldus Bakx, Taipei (TW)

(73) Assignee: Lite-On It Corporation, Taipei (TW)

( * ) Notice: Subject to any disclaimer, the term of this patent is extended or adjusted under 35 U.S.C. 154(b) by 253 days.

(21) Appl. No.: 12/464,219

(22) Filed: May 12, 2009

(65) Prior Publication Data
US 2009/0303852 A1 Dec. 10, 2009

Related U.S. Application Data

(60) Provisional application No. 61/131,184, filed on Jun. 6, 2008.

(51) Int. Cl.
*G11B 7/00* (2006.01)
(52) U.S. Cl. ............ 369/112.23; 369/44.32; 369/112.01
(58) Field of Classification Search ............. 369/112.02, 369/112.01, 44.32, 112.23, 44.12, 112.1, 369/12.03, 53.12, 53.14, 112.03, 53.1, 53.18
See application file for complete search history.

(56) References Cited

U.S. PATENT DOCUMENTS

| | | | | |
|---|---|---|---|---|
| 7,535,808 B2 * | 5/2009 | Ishimoto et al. | ........... | 369/53.22 |
| 7,613,082 B2 * | 11/2009 | Ishimoto et al. | ........... | 369/44.32 |
| 7,808,866 B2 * | 10/2010 | Lee et al. | ................... | 369/53.19 |
| 7,885,163 B2 * | 2/2011 | Shin | ............................. | 369/100 |
| 2006/0092783 A1* | 5/2006 | Andersen et al. | .......... | 369/44.37 |
| 2008/0106982 A1* | 5/2008 | Seo et al. | .................. | 369/44.22 |

* cited by examiner

*Primary Examiner* — Nabil Hindi
(74) *Attorney, Agent, or Firm* — Thomas, Kayden, Horstemeyer & Risley, LLP

(57) ABSTRACT

The optical scanning device [10] is arranged for scanning a record carrier [1]. The record carrier has an outer face [7]. The scanning device comprises a radiation source [11] for generating a radiation beam [12] and an objective system [25] having an exit face [26] arranged for evanescent coupling of the radiation beam between the exit face and the outer face and for converging the radiation beam to a focus [27]. A tilt measuring system [67, 77] provides a tilt signal [87; 88] representing a tilt angle between the objective system and the record carrier. A control unit [95] determines a distance signal representing a distance between the exit face and the focus from the tilt signal.

8 Claims, 3 Drawing Sheets

OPTICAL SCANNING DEVICE AND METHOD FOR DETERMINING FOCUS POSITION

CROSS REFERENCE TO RELATED APPLICATION

This application claims the benefit of priority under 35 U.S.C Section 119 from U.S. Provisional Patent Application Ser. No. 61/131,184, filed on Jun. 6, 2008 which is incorporated herein by reference.

FIELD OF THE INVENTION

The invention relates to an optical scanning device and to a method for determining a focus position in such a scanning device.

BACKGROUND OF THE INVENTION

International patent application WO 2006/018749 discloses a near-field optical scanning device for scanning a record carrier. In a near-field optical scanning device a radiation beam is transmitted across a gap between an exit face of an objective system and an outer face of the record carrier using evanescent coupling of the radiation. A gap servo keeps the size of the gap during scanning at a distance of approximately 25 nm. A tilt servo in the device controls the tilt angle between the objective system and the record carrier such that it is kept within a relatively tight tilt tolerance. This tolerance may be as small as 1.2 mrad. The tilt signal is determined from variations in an efficiency of the evanescent coupling across the exit face of the objective system. The position of the focus with respect to the exit face can be varied by varying the position of a lens in a telescopic system arranged in the optical path of the radiation beam.

A disadvantage of this known scanning device is that no signal is available representing the position of the focus along the optical axis.

It is an object of the invention to provide an optical scanning device in which such a signal is available.

SUMMARY OF THE INVENTION

The object is achieved by an optical scanning device for scanning a record carrier, said record carrier having an outer face, wherein said optical scanning device comprises: a radiation source for generating a radiation beam; an objective system having an exit face arranged for evanescent coupling of the radiation beam between the exit face and the outer face and for converging the radiation beam to a focus; a tilt measuring system for providing a tilt signal representing a tilt angle between the objective system and the record carrier; wherein the optical scanning device includes a control unit for determining a distance signal from the tilt signal and representing a distance between the exit face and the focus.

The distance between the exit face of the objective system and focus of the radiation beam can be derived from the tilt signal, because properties of the tilt signal depend on this distance. Since the tilt signal is a very stable signal, it can provide a reliable value for the distance.

In an advantageous embodiment of the scanning device the tilt signal is determined from variations in an efficiency of the evanescent coupling across the exit face.

Such a tilt signal depends mainly on the changes in evanescent coupling when the tilt angle changes, and only to a limited extent on parameters of the optical system of the scanning device and the record carrier. The tilt signal is therefore a parameter that is relatively independent of the scanning device and eminently suitable for determining the distance.

In a special embodiment the distance is related to a sensitivity of the tilt signal for changes in the tilt angle.

The sensitivity of the tilt signal for changes in the tilt angle depends on the distance between the exit face of the objective system and the focus. A larger distance gives a greater sensitivity. Hence, a determination of the sensitivity provides a measure for the distance.

It should be noted that international patent application WO 2007/122538 discloses an optical scanning device in which the sensitivity of the tilt signal depends on the distance between the exit face and the focus. This change in sensitivity has a disadvantageous effect on the operation of the tilt servo. To counter this effect, the gain of the tilt servo is adjusted during operation in dependence on said distance. The distance is determined using the height of the gap between the objective system and the record carrier. Due to restrictions in gap height, the changes in distance are restricted to a few tens of nm. Said patent application does not disclose to use the change in sensitivity of the tilt signal for a novel measurement signal that can represent the distance over a range of several micrometer.

In a special embodiment of the scanning device the control unit determines the sensitivity by varying the tilt angle and measuring the corresponding tilt signal.

Preferably, the tilt signal is normalized to make it independent of the radiation power of the radiation source.

The distance signal may be used to control the position of the focus when displacing the focus along the optical axis of the objective system. The distance signal may also be used to verify the position of the focus, e.g. to verify whether the gap servo is still functioning correctly.

Where a scanning device includes a spherical aberration compensator for introducing an amount of spherical aberration in the radiation beam, the amount of spherical aberration is advantageously controlled by the distance signal. Since the spherical aberration depends on the distance travelled by the radiation beam through the record carrier, the distance signal can be used to correct for the change in spherical aberration in a feed-forward manner when displacing the focus along the optical axis.

A further aspect of the invention relates to a method for determining a position of a focus of a radiation beam of an optical scanning device for scanning an optical record carrier, the method comprising the following steps: converging a radiation beam to a focus by an objective system, the radiation beam being evanescent coupled between an exit face of the objective system and an outer face of the record carrier; varying a tilt angle between the objective system and the record carrier; measuring a tilt signal representing said tilt angle; and determining the position of the focus as a distance between the exit face and the focus using the tilt signal.

In a special embodiment the method includes the steps of varying the tilt angle; determining a sensitivity of the tilt signal for changes in the tilt angle; and determining the distance from the sensitivity.

Further features and advantages of the invention will become apparent from the following description of preferred embodiments of the invention, given by way of example only, which is made with reference to the accompanying drawings.

DETAILED DESCRIPTION OF THE INVENTION

Figure 1:
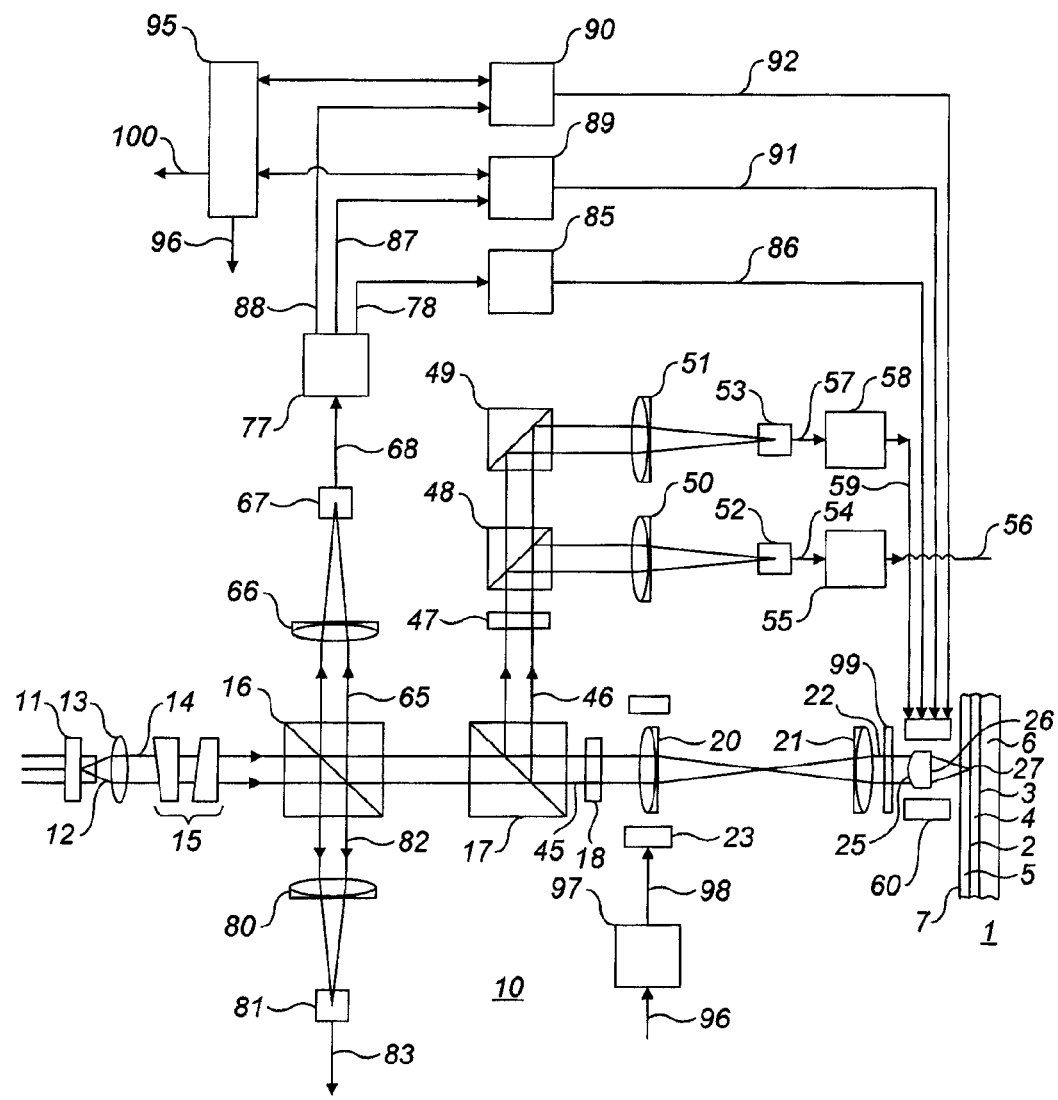
FIG. 1 shows schematically a record carrier and an optical scanning device in accordance with an embodiment of the invention.

FIG. 1 shows schematically a record carrier and an optical scanning device for scanning a record carrier in accordance with an embodiment of the present invention.

The record carrier 1 is to be scanned by the optical scanning device. The record carrier is of a multi-layer type, having two information layers 2 and 3 separated by a spacer layer 4. The information layer 2 may be protected from environmental influences by a cover layer 5. The information layers are arranged on a substrate 6, providing mechanical support for the layers. An outer face 7 of the record carrier faces the scanning device.

User information may be arranged in tracks in the information layers of the record carrier. For a disc shaped record carrier each of the tracks forms a 360° turn of a spiral. The tracks may include land and groove portions. The information is coded in the form of information areas having properties different from the surrounding areas to allow optical detection of the information areas. The properties may be e.g. reflectivity or magnetization. The information may also be organized in tracks without land and groove portions, the data areas themselves defining the tracks.

The scanning device 10 comprises a radiation source 11, which may be a semiconductor laser, for generating a radiation beam 12, having a wavelength of e.g. 405 nm. A collimator lens 13 transforms the diverging radiation beam from the radiation source to a collimated beam 14. A beam shaper 15 may be arranged in the radiation beam to give the radiation beam a circular cross-sectional profile. The collimated beam 14 passes through a non-polarizing beam splitter 16 and a polarizing beam splitter 17. An optional quarter-lambda plate 18 changes an incoming linear polarization of the radiation into a circular polarization. The collimated beam passes through a telescopic system formed by a first focus adjustment lens 20 and a second focus adjustment lens 21. When the two lenses are in a neutral position, a radiation beam 22 leaving the telescopic system is collimated. The axial position of the first lens 20 can be changed by an actuator 23. A change from the neutral position changes the vergence of the radiation beam 22.

The radiation beam 22 is incident on an objective system 25, which converges the radiation beam to a focus 27 for scanning the information layers 2, 3 of the record carrier 1. Although the objective system is shown as a single lens in FIG. 1, it usually comprises at least two lenses. A change in vergence of the radiation beam 22 changes the axial position of the focus.

Figure 2:
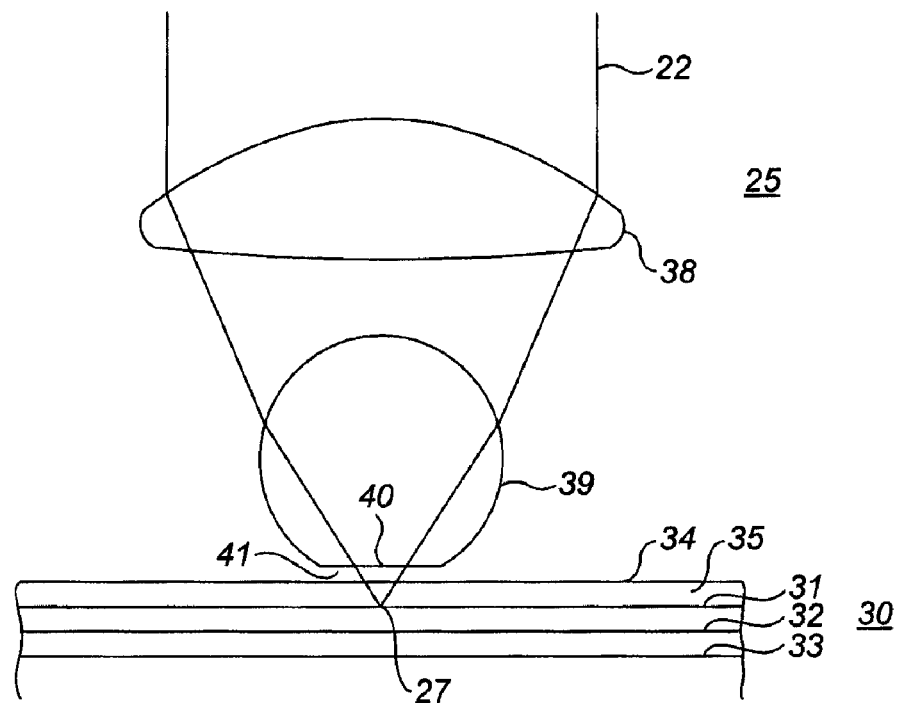
FIG. 2 shows an enlarged view of the objective system of the scanning device.

FIG. 2 shows an enlarged view of the objective system 25 for converging the radiation beam 22 to the focus 27 in a record carrier 30 having three information layers 31, 32, 33. The record carrier has an outer face 34 facing the objective system. The information layers 31, 32 and 33 are arranged at a depth of 3, 5 and 8 micrometer below the outer face, respectively. The highest information layer 31 is covered by a cover layer 35. The objective system 25 comprises a lens 38 and a so-called solid immersion lens (SIL) 39. The SIL shown in the Figure is of the super-hemispherical type. The SIL has a flat exit face 40 which faces the outer face 34 of the record carrier, leaving a small gap 41 between the objective system and the record carrier. During scanning of the record carrier the height of the gap is kept at a value of typically a tenth of the wavelength of the radiation beam. In the present embodiment to gap height is approximately 40 nm. The short distance between the exit face in the outer face allows an evanescent coupling of radiation between the objective system and the record carrier, permitting the radiation beam to enter the record carrier with a numerical aperture (NA) larger than 1.

Referring again to FIG. 1, a returning beam 45, formed by radiation reflected by the record carrier and the objective system, returns along the path of the incident beam 22. If the radiation beam 12 from the radiation source having a first state of polarisation passes through the quarter-lambda plate 18, is reflected by the objective system and record carrier acting as a perfect mirror, and passes again through the quarter-wave plate, it will have a state of polarisation perpendicular to the first state. The polarising beam splitter 17 is configured to split off the component of the returning beam having this perpendicular state of polarisation in the form of a first detection beam 46. This component is primarily caused by reflection of the radiation beam 22 on the record carrier 1. The component of the returning beam 45 having the first state of polarisation passes through the polarising beam splitter 17 on towards the non-polarising beam splitter 16.

The first detection beam 46 is analyzed in a first detection branch, which comprises a half-lambda plate 47, a polarising beam splitter 48, a non-polarising beam splitter 49, two detector lenses 50 and 51, a first detection system 52 and a second detection system 53. The half lambda plate 47 and the polarising beam splitter 48 adjust the distribution of radiation power over the detection systems 52 and 53. The polarising beam splitter 48 couples out part of the first detection beam, which part is converged by the detection lens 50 onto the first detection system 52. A detection signal 54 generated by the first detection system is also called the central aperture signal and represents information read by the radiation beam from the record carrier 1. The detection signal is processed in a signal processor 55, amongst others for decoding and error correction. The signal processor provides as output an information signal 56 representing in digital form the information read from the record carrier.

The part of the first detection beam 46 not deflected by the polarising beam splitter 48, is deflected by the non-polarising beam splitter 49 and converged by the detection lens 51 on to the detection system 53. The non-polarising beam splitter 49 may also be a mirror; alternatively, the detection lens 51 and the detection system 53 may be arranged directly in the radiation beam from the polarising beam splitter 48. The detection signal 57 generated by the detection system 53 is processed in a signal processor 58 to form a transverse error signal. The transverse error signal represents the transverse distance between the focus 27 and the centre of the track of the record carrier being scanned. The transverse error signal may be formed in any known way, for instance by means of the so-called push-pull method or the so-called DPD method. The transverse servo controller 58 outputs a transverse control signal 59 that controls an actuator 60 by moving the objective system 25 in a transverse direction, which is the radial direction if a disc-shaped record carrier is used. This movement changes the position of the focus 17 in the plane of the information layer in a direction perpendicular to the tracks. The detection system, the signal processor, the transverse servo controller and the actuator together form a transverse servo. When the transverse servo operates in closed loop, it keeps the focus 27 on the centre of the track during scanning of the information layer.

The non-polarising beam splitter 16 forms a second detection beam 65 by splitting off part of the component of the returning beam 45 having the first state of polarisation that has been transmitted by the polarising beam splitter 17. This component is primarily caused by reflection of the radiation beam 22 on the exit face 26 of the objective system 25. This so-called induced component has, on exiting the objective system 25, a state of polarisation perpendicular to the state of polarisation of the radiation beam 22 incident on the objective system. The amplitude of the induced component depends on the amount of evanescent coupling between the SIL 39 and the record carrier 1, 30. The second detection beam 65 is used in a second detection branch, including a detection lens 66 for converging the detection beam 65 an a third detection system 67. The second detection branch generates a gap error signal and one or more tilt signals, as explained in the following paragraphs.

Figure 3:
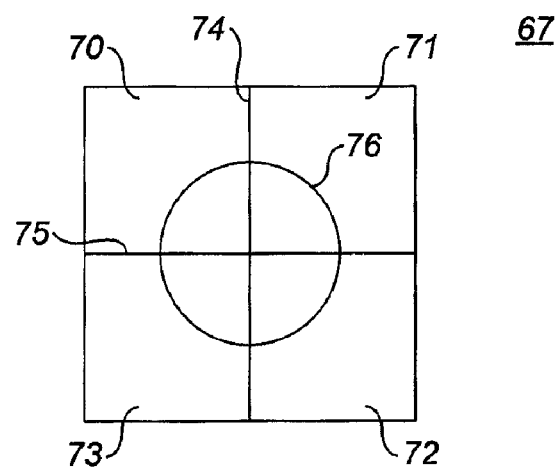
FIG. 3 shows a detection system for the induced component.

FIG. 3 shows the third detection system 67 for the induced component. The detection system is of the quadrant-type, having four detectors 70-73 separated by perpendicular dividing lines 74 and 75 and arranged as shown in the Figure. The second detection beam forms a spot 76 on the detection system. Each detector forms a detector signal, which detector signals 68 that are input in a signal processor 77. The signal processor forms a sum signal S70+S71+S73+S74 of the four detector signals, where SX is the detector signal of detector X. The sum signal is a measure of the total amount of radiation in the induced component. Since the total amount of radiation is also a measure for the amount of evanescent coupling, which depends on the height of the gap 41, the sum signal is a measure for the gap height and can be used for controlling the gap height. If the radiation power of the radiation source is not maintained at a constant level, the sum may be normalised by a signal representing the radiation power emitted by the radiation source. The scanning device of FIG. 1 generates this signal by a forward-sense branch comprising a detection lens 80 and a fourth detection system 81. The non-polarising beam splitter 16 couples out part of the radiation beam 12 from the radiation source 11 as a third detection beam 82. The detection lens 80 converges the third detection beam on the fourth detection system 81. The detection system generates a first power signal 83 representing the power emitted by the radiation source 11. The sum signal normalised by the first power signal is output by the signal processor 77 as a normalised sum signal 78.

The normalised sum signal 78 is input to a gap servo controller 85. The gap servo controller subtracts a predetermined signal from the normalised sum signal, thereby forming a gap-error signal as disclosed in patent U.S. Pat. No. 6,717,896. The gap servo controller uses the gap-error signal to form a gap-height control signal 86. The gap-height control signal controls the actuator 60 by moving the objective system 25 in an axial direction. The detection system 67, the gap servo controller and the actuator together form a gap-height servo. When the gap-height servo operates in closed loop, it keeps the height of the gap 41 at a constant value.

The signal processor 77 also forms a first tilt signal 87 and a second tilt signal 88 from the detector signals 68. A tilt between exit face 40 of the SIL and the outer face 34 of the record carrier will increase the gap height at one side of the gap 41 and decrease it at the other side. The change in evanescent coupling across the gap results in a change in intensity across the spot 76 on the detection system 67. When the dividing line 74 of the detection system corresponds to a direction tangential to the track being scanned, the first tilt signal (S70+S73)−(S71+S72), where SX represents the detector signal of detector X, represents the tilt about the tangential direction. Similarly, the second tilt signal (S70+S71)−(S72+S73) represents the tilt about the transverse direction. The first and second tilt signal are both normalised by the sum signal (S70+S71+S72+S73) to make the tilt signals independent of the total radiation power incident on the detection system 67. The detection system 67 and the signal processor 77 form a tilt measuring system.

The first tilt signal 87 and the second tilt signal 88 are input in a first tilt servo controller 89 and a second tilt servo controller 90, respectively. The controllers form each a tilt control signal 91 and 92 for controlling the actuator 60. The actuator may control the tilt of the objective system by piezo's or an electromechanical contraption. When the tilt servos operate in closed loop, the tilt angle in two directions between the objective system and the record carrier is minimised. Further details about the measurement of the tilt and the actuator are disclosed in patent application WO 2007/004141.

Figure 4A:
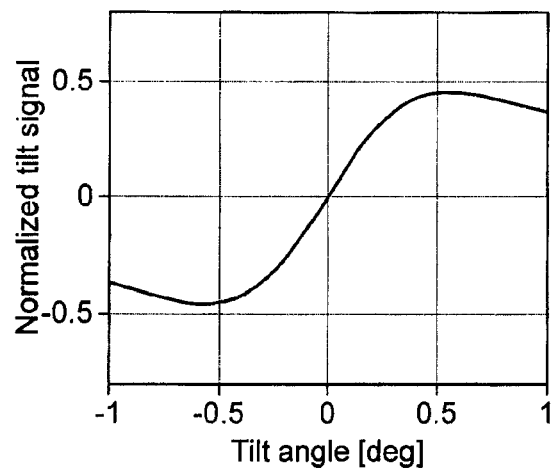
FIGS. 4(a), (b) and (c) show the normalised tilt signal as a function of tilt angle for three different position of the focus.
Figure 4B:
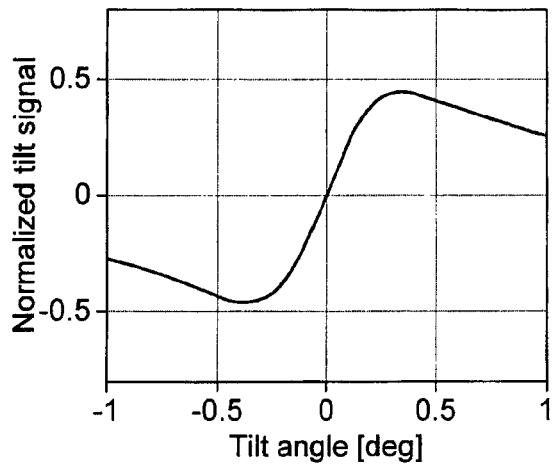
Figure 4C:
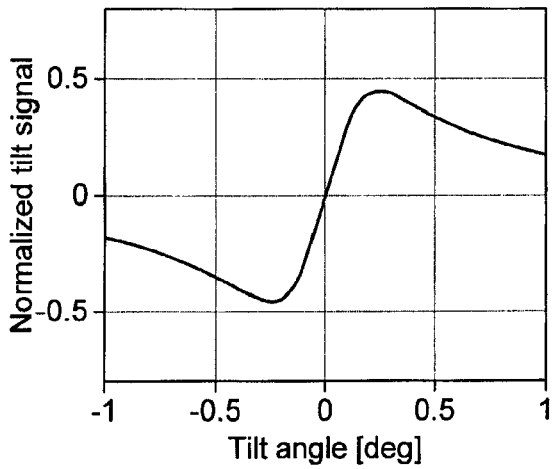

FIG. 4 shows three graphs of one of the tilt signals as a function of the tilt angle. FIGS. 4($a$), ($b$) and ($c$) relate to the focus 27 being positioned on the information layer 31, 32 and 33, respectively, i.e. at a depth of 3, 5 and 8 micrometer below the outer face 34 of the record carrier 30. The slope around zero tilt increases at increasing depth of the focus. The slope or sensitivity is to a certain degree proportional to the position of the focus. This can be explained by the increase of the diameter of the radiation beam in the gap from 15 to 45 micrometer when the depth of the focus increases from 3 to 8 micrometer. The increase of the area of the exit face 41 where frustrated internal reflection occurs affects the induced component in the returning radiation beam, which in turn affects the tilt measurement.

The sensitivity of the tilt signal for changes in the tilt angle can be used to determine the position of the axial focus, which may be expressed as the distance between the exit face 40 of the objective system and the focus 27. The change in slope is determined by measuring the tilt signal as a function of a disturbance applied to the tilt servo. The disturbance is a sinusoidal variation and is generated in a control unit 95. The disturbance is fed into the first or second tilt servo controller, depending on which servo is used to measure the distance. The measurement may be made with the tilt servo having the smallest tilt error signal, thereby providing more allowance for the disturbance without the risk of the exit face coming into contact with the record carrier. Common values for the tilt tolerance are between 1 and 2 mrad. The disturbance for the present embodiment has an amplitude of 0.5 mrad. A smaller value is also feasible, because the SNR of the tilt signal is relatively high.

The tilt servo controller injects the disturbance in the servo loop, causing the actuator 60 to apply the periodically varying tilt to the objective system 25. The amplitude of the consequential tilt signal is measured in the control unit 95, for instance applying synchronous detection or a narrow band filter. Such signal detection reduces the required tilt variation.

The value of the slope can be calibrated by measuring the slope for a well-defined focus distance, e.g. for the information layer 31, where the distance below the outer face 34 is equal to the thickness of the cover layer 35. The calibration can be carried out off-line, i.e. during development or manufacturing of the scanning device, and the result stored in firmware or in a memory of the control unit 95, e.g. in the form of a look-up table, relating an amplitude of the tilt signal measured when injecting the disturbance to a distance between the exit face and the focus.

The distance can be used verify the position of the focus and to assess the proper functioning of the optical system. Only if the distance, or the tilt slope, is within a certain window, the objective system 25 and gap servo can be trusted to function correctly. The distance can be measured at regular intervals; when the distance is not within the window, a reset procedure can be carried out for the objective system.

When the position of the focus is to be changed from e.g. the first information layer 34 to the second information layer 35, the axial position of the focus must be changed in a feed-forward manner, because a focus error signal representing the distance between the information layer to be scanned and the focus as is commonly used in optical recording is not available in a scanning device using evanescent coupling. The distance signal according to the invention can be used for such a feed-forward positioning of the focus.

The distance between the exit face and the focus is used in the present embodiment of the scanning device for determining the position of the objective system 25 during scanning in an axial direction. A distance signal representing the distance between the exit face and the focus, formed by the control unit 95 can be used for an axial focus displacement servo. The axial focus displacement servo includes one of the tilt servo controllers 89 and 90, the control unit 95 and an axial focus displacement servo controller 97. The distance signal is compared with a desired focus distance and a resulting error signal 96 is fed into the servo controller 97. A focus displacement control signal 98 output by the servo controller 97 is fed into the actuator 23, which controls the axial position of the focus adjustment lens 20. The position of the focus adjustment lens determines the distance between the exit face 41 and the focus 27.

The feed-forward displacement of the focus can be used to bring the focus close to the position of the second information layer 35. A maximisation of the amplitude of the detection signal 54 can be used for fine-tuning the axial position of the focus on the second information layer 35.

During the axial displacement of the focus from the information layer 34 to the information layer 35, the spherical aberration incurred by the radiation beam through the changing thickness of material it traverses reduces the quality of the focus. The reduction of the quality may make the detection signal 54 useless for determining the presence of the information layer 35. This reduction can be remedied using an adjustable spherical aberration compensator 99 arranged in the radiation beam 22, which introduces spherical aberration in the radiation beam to compensate spherical aberration incurred in the record carrier. Since the amount of spherical aberration incurred by the radiation beam is linearly related to the thickness of material of the record carrier it has traversed, the distance signal representing the distance between exit face of the objective lens and the focus can be used to control the amount of spherical aberration introduced by the spherical aberration compensator. Therefore the control unit 95 uses the distance signal indicating the instantaneous position of the focus 27 during the axial displacement in the record carrier to form a control signal 100. The control signal 100 controls the spherical aberration compensator 99 in a feed-forward manner, thereby maintaining the quality of the focus 27 at a sufficient level to enable detection of information in an information layer of a record carrier. The relation between the distance signal and the amount of spherical aberration to be introduced in the radiation beam can be stored in a memory of the control unit 95.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning a record carrier, said record carrier having an outer face, wherein said optical scanning device comprises:
    a radiation source for generating a radiation beam;
    an objective system having an exit face arranged for evanescent coupling of the radiation beam between the exit face and the outer face and for converging the radiation beam to a focus;
    a tilt measuring system for providing a tilt signal representing a tilt angle between the objective system and the record carrier;
    a control unit for determining a distance signal from the tilt signal and representing a distance between the exit face and the focus; and
    a spherical aberration compensator for introducing an amount of spherical aberration in the radiation beam, wherein the amount of spherical aberration is controlled by the distance signal.

2. An optical scanning device according to claim 1, wherein the tilt signal is determined from variations in an efficiency of the evanescent coupling across the exit face.

3. An optical scanning device according to claim 1, wherein the distance is related to a sensitivity of the tilt signal for changes in the tilt angle.

4. An optical scanning device according to claim 3, wherein the control unit determines the sensitivity by varying the tilt angle and measuring the corresponding tilt signal.

5. An optical scanning device according to claim 4, wherein the tilt signal is normalized.

6. An optical scanning device according to claim 1, wherein the distance signal is used to control or verify the position of the focus.

7. A method for determining a position of a focus of a radiation beam of an optical scanning device for scanning an optical record carrier, the method comprising the following steps:
    converging a radiation beam to a focus by an objective system, the radiation beam being evanescent coupled between an exit face of the objective system and an outer face of the record carrier;
    varying a tilt angle between the objective system and the record carrier;
    measuring a tilt signal representing said tilt angle;
    determining the position of the focus as a distance between the exit face and the focus using the tilt signal; and
    controlling an amount of spherical aberration in the radiation beam by the distance signal.

8. A method according to claim 7, including the steps of varying the tilt angle;
    determining a sensitivity of the tilt signal for changes in the tilt angle; and
    determining the distance from the sensitivity.

* * * * *